(12) United States Patent
Sarsanedas Millet et al.

(10) Patent No.: US 10,315,284 B2
(45) Date of Patent: Jun. 11, 2019

(54) REMOVABLE ELECTRO-MECHANICAL DEVICE FOR BURNISHING AND SMOOTHING METAL PARTS

(71) Applicant: STEROS GPA INNOVATIVE, S.L., Barcelona (ES)

(72) Inventors: Pau Sarsanedas Millet, Barcelona (ES); Pau Narcis Guasch Piriz, Barcelona (ES); Arnau Garrell Bunuel, Barcelona (ES); Gerard Tordera Xandri, Barcelona (ES)

(73) Assignee: STEROS GPA INNOVATIVE, S.L., Barcelona (ES)

( * ) Notice: Subject to any disclaimer, the term of this patent is extended or adjusted under 35 U.S.C. 154(b) by 279 days.

(21) Appl. No.: 15/300,215

(22) PCT Filed: Mar. 26, 2015

(86) PCT No.: PCT/ES2015/070226
§ 371 (c)(1),
(2) Date: Apr. 13, 2017

(87) PCT Pub. No.: WO2015/144962
PCT Pub. Date: Oct. 1, 2015

(65) Prior Publication Data
US 2018/0200863 A1    Jul. 19, 2018

(30) Foreign Application Priority Data
Mar. 28, 2014    (ES) ................................ 201430427 U

(51) Int. Cl.
*C25F 3/22*    (2006.01)
*C25F 7/00*    (2006.01)
(Continued)

(52) U.S. Cl.
CPC .............. *B24B 37/04* (2013.01); *B24B 39/00* (2013.01); *C25F 3/22* (2013.01); *C25F 7/00* (2013.01); *H02K 7/145* (2013.01)

(58) Field of Classification Search
CPC ..... B24B 39/00–39/065; B24B 37/00–37/345; C25F 3/22; C25F 7/00
See application file for complete search history.

(56) References Cited

U.S. PATENT DOCUMENTS

2008/0053841 A1*    3/2008    Baertsch ............... C23C 14/021
                                                    205/640

FOREIGN PATENT DOCUMENTS

DE    2031833 A1 *    12/1971    ............... B23H 5/06
DE    2031833 A1        12/1971
(Continued)

OTHER PUBLICATIONS

English Translation of International Search Report of PCT/ES2015/070226 dated May 29, 2015.
(Continued)

*Primary Examiner* — Nicholas A Smith
(74) *Attorney, Agent, or Firm* — Amster, Rothstein & Ebenstein LLP

(57) ABSTRACT

The invention relates to a removable electro-mechanical device for burnishing and smoothing metal parts, said device comprising: a tank (2) containing an electrolytic solution and the cathode (c); a main body (3) which closes the tank (2), and in which the electrical contacts (6), the mechanical components and the drive systems (5) are incorporated, said drive systems being located in the lower portion of the main body (3) and being vertically and radially secured to a part (7) such that, in addition, when said body (3) is coupled to the tank (2), they remain immersed in the solution; and a detachable head (4) that can be coupled to the main body (3)

(Continued)

and includes an electric motor (14) linked to a rotating body (15) and a removable, coupleable, rod-shaped supporting structure (41) or anode (a) having securing means (42) for the parts to be treated, and being disposed in such a way that, when said head (4) is coupled to the main body (3), the parts remain immersed in said solution.

8 Claims, 3 Drawing Sheets

(51) Int. Cl.
      *H02K 7/14*     (2006.01)
      *B24B 37/04*    (2012.01)
      *B24B 39/00*    (2006.01)

(56) References Cited

FOREIGN PATENT DOCUMENTS

| | | | |
|---|---|---|---|
| ES | 355323 | A1 | 11/1969 |
| GB | 1240375 | A | 7/1971 |

OTHER PUBLICATIONS

Written Opinion in Spanish Language of PCT/ES2015/070226 dated May 29, 2015.

\* cited by examiner

REMOVABLE ELECTRO-MECHANICAL DEVICE FOR BURNISHING AND SMOOTHING METAL PARTS

OBJECT OF THE INVENTION

The invention, such as expressed in the title of present description, refers to a demountable electromagnetic device for burnishing and polishing of metallic pieces, which provides several advantages and innovative features which are inherent to its particular configuration, which will be described in detail in the paragraphs below and which involve a remarkable novelty in the current state of the art.

The object of present invention concretely centers on an electromagnetic device applicable to mechanical-galvanic processes for burnishing and polishing of metallic pieces, for example for gold pieces for jewelry and their alloys, which are improved with a determined mechanical interaction, which in an innovative manner, in addition to presenting a smaller size in comparison with those already in existance, which will also allow for its use in any small workshop and jewelry store, presenting a structural configuration of the elements which make it up, composed from demountable parts which will provide it with notable advantages in use as well as effectiveness and safety.

FIELD OF THE INVENTION

The field of invention for instant application lies within the industry sector dedicated to burnishing and polishing of metallic pieces, for example gold jewelry pieces and their alloys, especially encompassing the manufacture of apparatuses, machinery and tools for carrying out such functions.

BACKGROUND OF THE INVENTION

The mechanical-galvanizing processes for burnishing and polishing of metallic pieces, normally gold, silver or similar jewelry pieces or their alloys are well known in the state of the art, which involve the immersion of said pieces into a solution which constitutes an electrolytic medium and in which mechanical actions are combined or yet which are caused by the movement of the pieces, fixed unto a mobile support, into a solution which incorporates particles in suspension, or yet which are provoked by means of brushes which propel the particles towards the pieces, in which case, it may be these which present the movement.

As an example of the above, and referencing the current state of the art, various documents can be cited related to the polishing of metal pieces. By means of document ES2343298A1 a "Means, Procedure and Device for the superficial treatment of the surfaces of gold pieces or their alloys" is known, in which the means contains thiocyanic acid HNCS or a salt thereof and preferably a substance which elevates the viscosity to an appropriate level. The articles to be polished submerged in a medium of chemically inert particles embedded in the electrolytic medium when passing an electric current and connected to the positive pole; develop an anodic coating with electric resistivity higher than the electrolyte in its set. The device ensures the fastening and electric connection of the articles once they are placed in movement within the particle bedding.

Patent ES2239912 A1 makes known a process of "electrolytic polishing for metals in amphipathic molecules emulsions" in which the pieces come into contact with the electrolyte through immersion or by means of projection thereof over the surface. The electrolyte used is a heterogeneous system which contains organic substances, polar substances, amphipathic molecules and inert particles in suspension.

Patent WO2007/121999 makes known a "solution for the electrochemical polishing of metal articles" in which it similarly describes a procedure and a device for polishing by means of electric current application between an anode and a cathode, where the anode is the article to be treated. The device comprises a recipient with the solution; the recipient being vertically divided by a separator which defines two glasses intercommunicated on their lower part through a mesh or platen with orifices.

Similarly, as highlighted above, machines or devices are known for the application thereof or other similar mechanical-galvanic procedures which are based on the passage of electric current and which additionally combine mechanical operations through propelling elements consisting in a single block of brushes set in a horizontal position and which are displaced in an alternative circular or oval movement to attack the pieces or articles to be burnished and polished which are submerged in the electrolytic solution coupled unto a supporting element which is also structurally horizontal, all of which causes these machines to be made up of elements which have a large volume and a complex configuration with difficult maintenance and cleaning which impedes the jewelry establishments themselves from having these available in their workshops or in the establishments themselves, which would end up being more practical, faster and more cost effective.

The objective of present invention is therefore, to develop a new device for polishing and burnishing of metal pieces processes which essentially, contemplates a much simpler and size-decreased structure to solve the above described problem, where it should be highlighted that, at least on behalf of applicant, no other device is known which presents the technical, structural and constitutive features which are similar to those hereby recommended and accordingly claimed.

EXPLANATION OF THE INVENTION

The demountable electromagnetic device for burnishing and polishing of metallic pieces proposed by this invention is configured as a notable novelty within the field of the application, whereby the characterizing feature details which distinguish it, are conveniently claimed in the final claims which accompany present description.

Thus, what the invention proposes, is that as already described above, an electrochemical device applicable to mechanical-galvanic processes for burnishing and polishing of metallic pieces, wherein a continuous electric current is applied by means of a pair of electrodes connected to an electric feeding source and submerged in the solution with particles, being complemented with a mechanical interaction by means of elements for propelling the particles, which is distinguished by having a smaller size, being practically portable, and especially for presenting an innovative structural configuration based on demountable parts and which are attachable to each other, which provides advantages both in their use as well as safety.

More concretely, the device of the invention is configured, essentially from four demountable parts and which are attachable to each other:

a container in tank shape, into which an electrolytic solution is incorporated and which contains an electrode connected to the negative pole or cathode, constituted for example, by an inner layer thereof, some protuberances or other element;

a main independent body which closes over said tank and which incorporates all the mechanical part and the electric contacts;

an extractable head, which incorporates the motorization as well as the electronic part;

and a frame which constitutes the support where the pieces will be burnished and polished.

This disposition provides notable advantages, among which the following stand out: the essentially greater ease of transport, the greater ease of cleansing of the tank, the greater ease of liquid changing and increased safety given the ability to separate the mechanical and electric parts, the increased safety involved with said cleaning labor as the parts are completely unlinked between them when they are demounted, given that the electricity which feeds the system only arrives at the cathode present in the tank and to the motor once the head is placed in its position, having provided for this, that the means of adjusting between the head and the frame constitute electric connections.

In a preferred embodiment of the invention, the frame of the pieces to be treated is incorporated coupled by means of a rapid connection system to the lower part of the head, in such a way that upon being inserted, it crosses the main body which closes the tank on its upper part, so that the pieces are found submerged within the solution. Additionally, preferably, this support constitutes the electrolytic process anode, if this would not involve a limitation.

Continuing on with the features of the invention, it should be highlighted that in the preferred embodiment of the device, the main body, which is coupled over the tank such that two demountable and attachable parts to each other, are formed, incorporates the mechanically driving parts of the device with the propelling brushes, which are coupled to its lower part by fastening means which determine the movement thereof.

Through this disposition, the advantages of the device are increased, given that by separating the head from the main body, the device remains more secure without movement and/or current.

However, the main advantage of the device being divided into the parts described above is the fact of being able to maintain the mechanical part without the electrical part and being able to demount the tank to be able to change the liquids without the mechanical and electrical parts.

Another inherent advantage is that the tank is left closed when the machine is stopped and when it is functioning, thus avoiding that the liquid evaporates.

Additionally, this disposition also eases the extraction of the pieces to be treated.

In the preferred undertaking of the invention, the propulsion elements consist of some brushes, fixed vertically and radially to a piece provided for this purpose on the inner face of the lower part of the head, while the frame for the pieces, which adopts a configuration in the shape of a rod or vertical rods, is coupled unto a shell provided in the lower central part of the frame so that one and the other are submerged in the solution in the tank, upon inserting it into the tank and coupling the head over the main body making the frame of the pieces pass through the central cavity thereof, such that it is placed in the center of the tank, radially surrounded by the cited brushes which, in this manner, attack the pieces contained within it from all angles.

Additionally, the brushes present a movement, preferably concentric, provided by some mechanical drivers which the carcass incorporates radially in its lower part and which upon the head being inserted are coupled unto a rotating body provided in it, and which moves it, which, in turn is actuated by an electric motor incorporated into the body of said head.

Similarly, also in a preferred manner, the axis of this motor acts on the frame so that it itself rotates on itself.

The demountable device for polishing and cleaning jewelry pieces herein described therefore constitutes an innovative structure with structural and constitutive features which are unknown until now for the purposes described above, which are reasons which taken in conjunction with its practical use, grant it sufficient basis for obtaining the protection being sought for it.

DESCRIPTION OF FIGURES

To complement the description being undertaken, and with the objective of helping to render better comprehension of the features of the invention, together with the present description, as integral part of the same, a set of figures are attached, whereby in an illustrative manner and not a limitative one, the following is represented.

PREFERRED EMBODIMENT OF THE INVENTION

Figure 1:
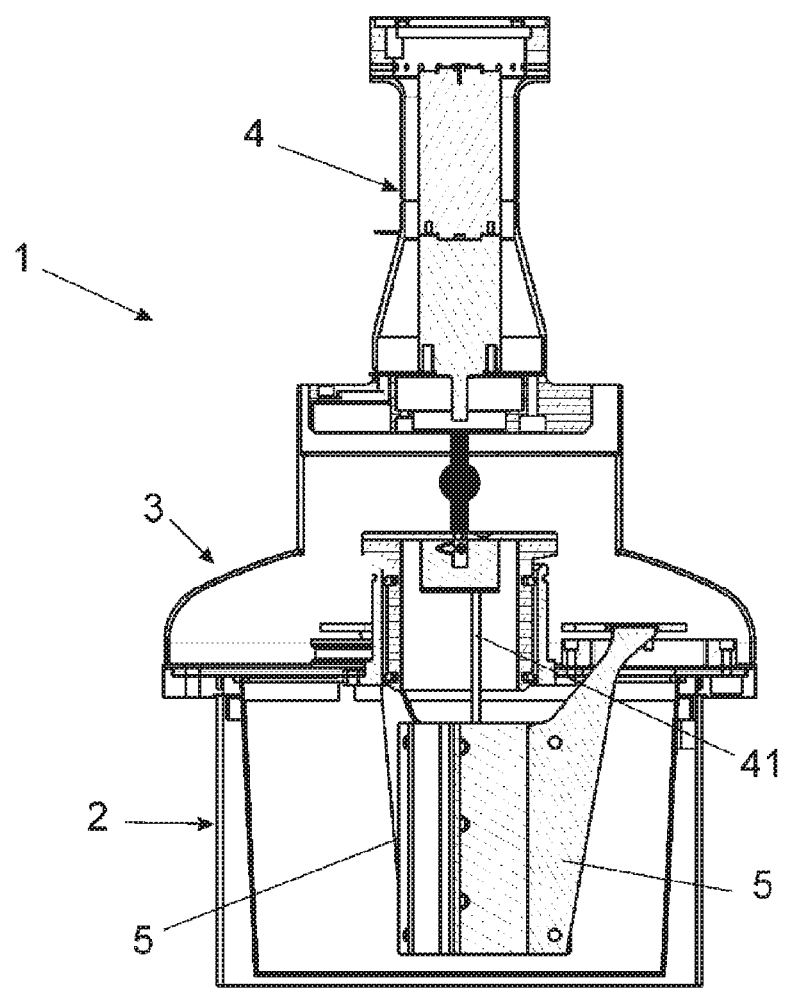
FIG. 1 shows a section view, according to a vertical cut, of an example of the demountable electromagnetic device for burnishing and polishing of metallic pieces, object of the invention, represented along with the set of all the parts it comprises mounted and attached between them.
Figure 2:
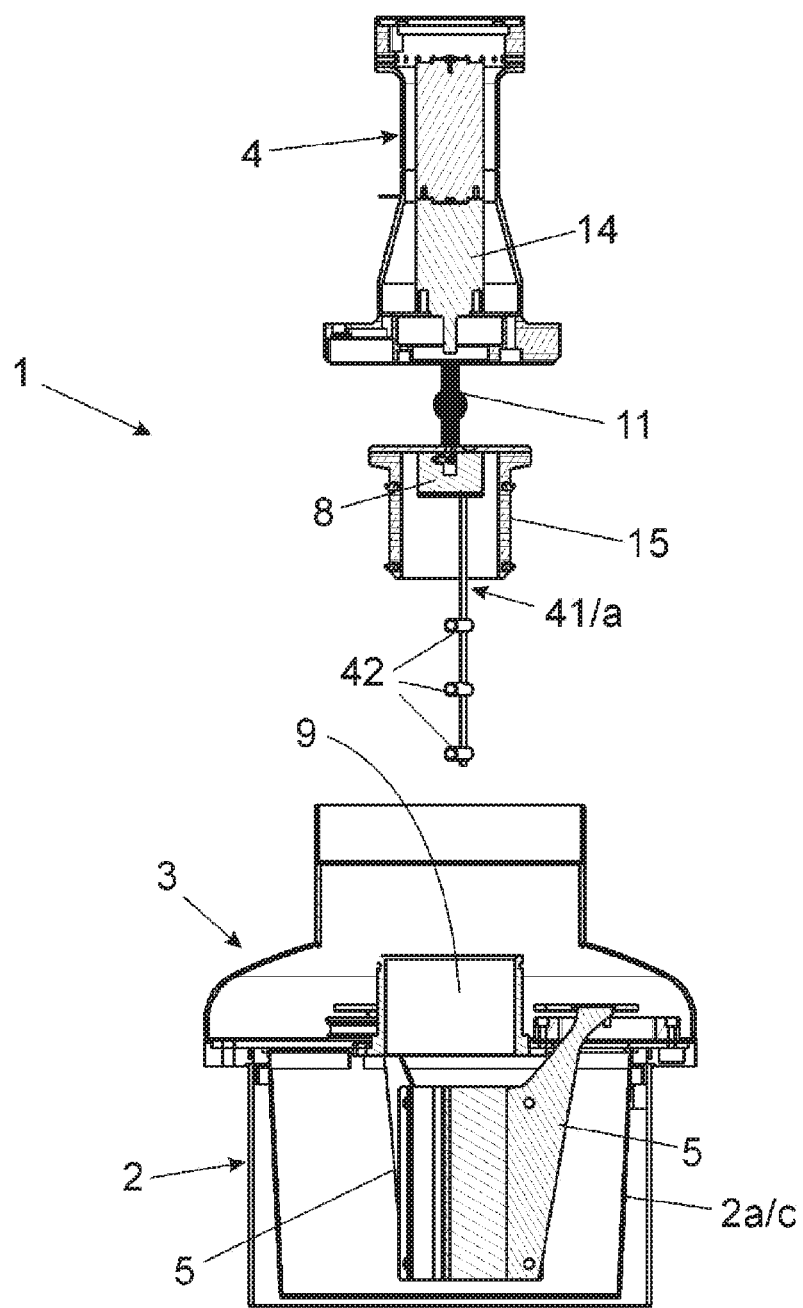
FIG. 2 shows a view, also a section view, according to a vertical cut, of the same example of the device according to the invention, in this case represented with the head and the frame for the pieces coupled between them and separated from the tank and from the main body, which are represented coupled unto each other, thus allowing to visualize with greater clearness the configuration of the support.

In light of the mentioned figures and according to the adopted numbering, it can be appreciated that in them one can see the preferred embodiment, but not limitative of the described demountable electromagnetic device for burnishing and polishing of metallic pieces, which comprises parts and elements which are described and indicated in detail as follows.

Such as can be seen in the figures, the device (1) in question, comprises several parts which are demountable and attachable between them, consisting of:

a tank (2) into which an electrolytic solution is incorporated and which contains the cathode (c);

a main body (3) which constitutes an independent element which closes over said tank (2) and which incorporates the electric contacts (6) and the mechanical components and propelling systems (5) which complement the mechanical-galvanic process, whereby these propelling systems (5) set in such a way that, upon closing the main body (3) over the tank (2) they remain submerged in the solution;

and an extractable head (4), which connects the frame (41) by means of a rapid connection system and which is coupled over the main body (3) and incorporates the motorization or electric motor (14) which moves the mechanical components as well as the electronic part (41) as well as the frame (41) for supporting where the pieces will be polished and burnished.

Figure 3:
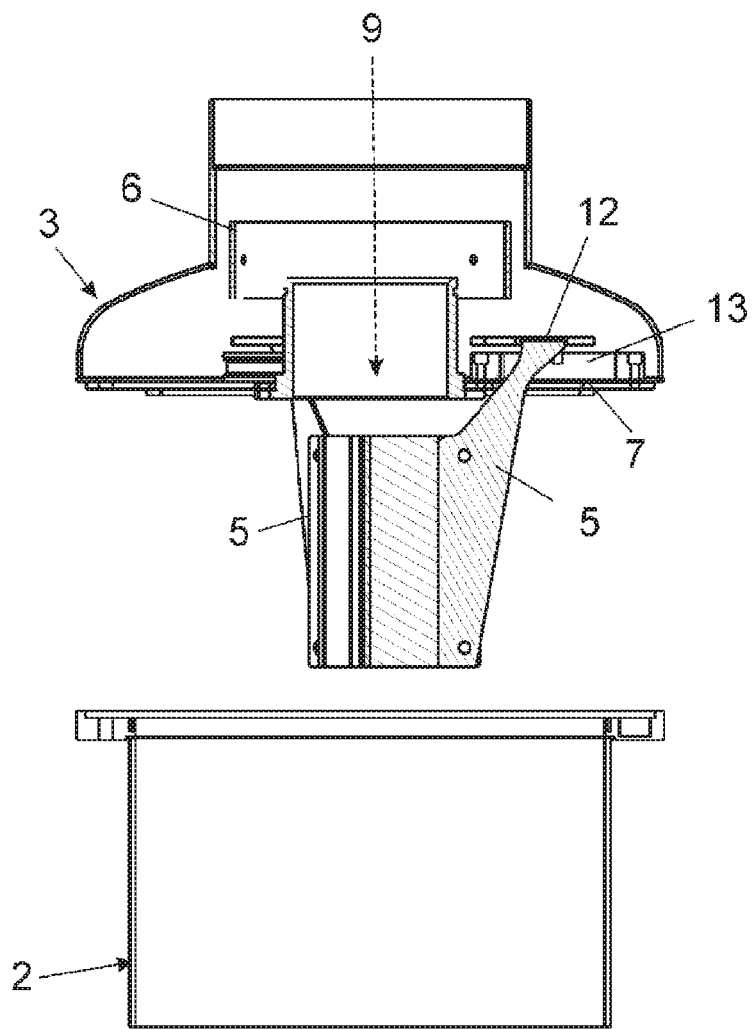
FIG. 3 shows another section view of the same example of the device according to the invention, in this case solely showing the tank and the main body separated from each other, being able to see the disposition of the mechanical elements which are incorporated.

This frame (41), is also preferably, also a demountable piece from the extractable head (4), and in any case, upon coupling the head (4) over the main body (3), it crosses a passing cavity (9) thereof to also remain submerged in the solution. This passing cavity (9) has been marked in FIG. 3 by means of a discontinuous sketch line which crosses it to ease its appearance.

Preferably, although not in a limitative manner, the frame (41) of the pieces to be treated constitutes the anode (a) itself, while also in a preferable manner, the cathode (c) is constituted by the inner surface (2a) of the tank (2).

Such as can be seen in the figures, in the preferred embodiment of the invention, the propelling systems (5) are incorporated into the lower part of the main body (3) attached, vertically and radially, in a piece (7) provided for this purpose on the inner face thereof and present a movement, preferably concentric, provided by a motor (14) of the head.

For this purpose, the motor (14) is linked to a rotating body (15) which, upon being coupled to the head (4) over the main body (3) transmits movement to the upper anchorages (12) of the propelling systems (5) so that they displace on some guides (13) of the piece (7) unto which they are fixed, imprinting the same with a concentric movement.

Similarly, the motor (14) by means of its axis (11) acts over the shell (8) unto which the frame (41) is coupled, which preferably consists with, at least one rod with fasteners (42) for the pieces to be treated, impressing on it a turning movement which makes it turn on itself.

It is important to highlight that the head (4) and the main body (3) have been provided with electric contacts (6) which are connected between themselves by coupling an element to the other in order to provide electric feed to the main body (3) emanating from the head (4) on whose upper end the network connection cable (not shown) is incorporated.

Having described the nature of present invention sufficiently, as well as having undertaken its practice, it is considered that it is not necessary to further explain it in order for a person skilled in the art to understand its scope and the advantages it provides, noting that within its essence, other undertakings of it which could differ in their detail from that of the example title of the invention could be carried out, all of which would attain equally the protection sought, as long as its fundamental principle is not altered, changed or modified.

The invention claimed is:

1. Demountable electromagnetic device for polishing and burnishing of metallic pieces which, applicable to mechanical-galvanic burnishing and polishing processes and comprising a tank (2) wherein an electrolytic solution is introduced into, a frame (41) which serves as a support element for placing the pieces to be treated, and some propelling systems (5) which attempt a complementary mechanical intervention to said processes, it is characterized by being configured by various parts demountable and attachable between each other, comprising:
a tank (2) into which an electrolytic solution is incorporated and which contains the cathode (c);
a main body (3) which constitutes an independent element which closes over said tank (2) and into which are incorporated the electric contacts (6), the mechanical components and propelling systems (5), whereby these propelling systems (5) are set in such a way that, upon coupling said body (3) over the tank (2) they remain submerged in the solution;
and an extractable head (4), which is coupled over the main body (3) and incorporates an electric motor (14) which moves the mechanical components and the electronic part as well as the frame (41) for supporting the pieces to be treated, also set such that, upon coupling said head (4) to the main body (3) the pieces will remain submerged in the solution.

2. Demountable electromagnetic device for polishing and burnishing of metallic pieces according to claim 1, characterized by the frame (41) also consisting of a piece which is demountable and attachable to the head (4) extractable by means of a rapid connection system.

3. Demountable electromagnetic device for polishing and burnishing of metallic pieces according to claim 1, characterized because the anode (a) is constituted by the frame (41) of the pieces to be treated itself.

4. Demountable electromagnetic device for polishing and burnishing of metallic pieces according to claim 1, characterized because the cathode (c) is constituted by the inner surface (2a) of the tank (2).

5. Demountable electromagnetic device for polishing and burnishing of metallic pieces according to claim 1, characterized because the propelling systems (5) are incorporated on the lower part of the main body (3), fixed vertically and radially in a piece (7) set for this purpose on the inner face thereof and present a movement provided by the motor (14) of the head (4).

6. Demountable electromagnetic device for polishing and burnishing of metallic pieces according to claim 5, characterized because the motor (14) is linked to a rotating body (15) which, upon being coupled to the head (4) over the main body (3) is coupled unto it, transmitting movement to the upper anchorages (12) of the brushes (5) so that they displace on some guides (13) of the piece (7) onto which they are fixed.

7. Demountable electromagnetic device for polishing and burnishing of metallic pieces according to claim 1, characterized because the motor (14), by means of its axis (11) acts on a shell (8) unto which the frame (41) is coupled, impressing on it a turning movement which makes it turn on itself.

8. Demountable electromagnetic device for polishing and burnishing of metallic pieces according to claim 1, characterized because the frame (41) consists with, at least one rod with fasteners (42) for the pieces to be treated.

* * * * *